United States Patent
Funahashi

(10) Patent No.: US 6,788,902 B2
(45) Date of Patent: Sep. 7, 2004

(54) SERVICE SUPPORT SYSTEM AND METHOD FOR IMAGE FORMING APPARATUS

(75) Inventor: Hiroyuki Funahashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/252,683

(22) Filed: Sep. 24, 2002

(65) Prior Publication Data

US 2003/0059221 A1 Mar. 27, 2003

(30) Foreign Application Priority Data

Sep. 25, 2001 (JP) ........................................ 2001-291632

(51) Int. Cl.[7] .............................................. G03G 15/00
(52) U.S. Cl. .................................. 399/8; 399/11; 399/34
(58) Field of Search ............................... 358/1.14, 1.15; 399/8, 9, 11, 34, 79; 702/56, 188

(56) References Cited

U.S. PATENT DOCUMENTS 6,587,646 B2 * 7/2003 Kikuchi et al. ................ 399/8

FOREIGN PATENT DOCUMENTS

| JP | A 8-328421 | 12/1996 |
|---|---|---|
| JP | A 11-309928 | 11/1999 |
| JP | A 2000-29807 | 1/2000 |

* cited by examiner

Primary Examiner—Hoang Ngo
(74) Attorney, Agent, or Firm—Oliff & Berridge, PLC

(57) ABSTRACT

With a push of a maintenance button disposed on a printer, printer information mail is created based on information previously stored in a memory, and sent to a mail server. The sent mail is read by a support server, the support server extracts maintenance information that best suits the contents of the sent mail from a database, and sends it as maintenance information mail to the mail server in reply to the mail. When the maintenance information mail arrives at the printer, cleaning is performed or error remedy is displayed or printed, according to the contents of the maintenance information mail.

16 Claims, 4 Drawing Sheets

SERVICE SUPPORT SYSTEM AND METHOD FOR IMAGE FORMING APPARATUS

BACKGROUND OF THE INVENTION

1. Field of Invention

The invention relates to a service support system for an image forming apparatus capable of sending and receiving messages via the Internet.

2. Description of Related Art

As an example of an image forming apparatus, a conventional electrophotographic printer includes consumable items, such as a photosensitive drum, a fixing roller and a cleaning pad for the fixing roller, which gradually deteriorate due to the accumulation of a contamination, dust, and foreign matters during the printing process. In particular, deterioration of the photosensitive drum and contamination thereon directly causes a reduction in image quality. Contamination on the fixing roller also causes adhesion of a recording sheet to the fixing roller and contamination on the bottom of the recording sheet. These problems lead to print quality problems.

These consumable items are to be replaced or cleaned by a user according to the degree of contamination and duration of service.

In the above printer, for example, the CPU counts the number of times printing occurs and the number of recording media used. When the counted number reaches a specified value, a message to prompt the user to clean a relevant consumable item is displayed on the LCD panel.

SUMMARY OF THE INVENTION

However, the timing to issue such a message is not always appropriate for all image forming apparatuses.

For example, in a printer in accordance with the above description, the types of images to be often printed are greatly different according to different users. Specifically, the burdens on each device differ according to a toner color to be used, coverage, and a difference between text and image. Therefore, the degree of contamination on the photosensitive drum and the fixing roller, the type and place of contamination likely to occur are greatly different according to the above differences, and it is difficult to determine the time in which to give a warning about cleaning in all cases just from the number of times of printing occurs and the number of printed sheets used.

If the timing is appropriate, it is difficult for the user to do the cleaning according to an appropriate method. The cleaning method fundamentally needs to change according to the degree, type, and place of contamination. However, conventionally, a standardized cleaning method is only proposed or performed, and appropriate action is not taken according to the circumstances.

Further, in a conventional image forming apparatus, the cleaning method is factory-adjusted. When a further effective cleaning method is found thereafter or the factory-adjusted cleaning method needs changing after new toner and recording sheets are released, no action is taken.

Additionally, it is impractical for a user to make a judgement of a current status of contamination and find an optimum cleaning method and implement it. Conversely when the user misjudges, the condition of the image forming apparatus may become worse. On the other hand, maintenance of the image forming apparatus by a service person of a maintenance service company greatly imposes a labor burden on the maintenance service company and financial burden on the user.

The invention provides a service support system for an image forming apparatus that can provide users with the newest, optimally meticulous cleaning information at all times.

In one exemplary aspect of the invention, the service support system of the invention may include an image forming apparatus and a service support center which communicate each other with messages via a network. The image forming apparatus may include an printing device that outputs an image to a printing medium, a extracting device that extracts information regarding the image forming apparatus required for a service support, a sending device that sends the information extracted by the extracting device to the service support center as a main body of a message or an attachment to the message, a receiving device that receives a reply message from the service support center in response to the message sent by the sending device, and a control device that activates the image forming apparatus based on the reply message. The service support center may include a database that previously stores a plurality of maintenance processes required for the image forming apparatus, a receiving device that receives the message sent from the image forming apparatus, a searching device that searches maintenance information corresponding to the inside information contained in the received message from the database, and a sending device that sends the searched maintenance information to the image forming apparatus as a main body of the reply message or an attachment to the reply message.

According to the service support system of the invention, information necessary for the service support is extracted by the extracting device. The extracted information is sent, by the sending device, as a message or an attachment to the message. As a result, the information arrives at the receiving device of the service support center through the network. In the service support center, service support information corresponding to the information necessary for the service support is stored. The searching device searches the service support information from the database based on the information necessary for the service support listed in the message or the attachment to the message.

BRIEF DESCRIPTION OF THE DRAWINGS

The invention will be described in greater detail with reference to a preferred embodiment thereof and the accompanying drawings wherein.

DETAILED DESCRIPTION OF PREFERRED EMBODIMENTS

An embodiment of the invention will be described in detail with reference to the accompanying drawings.

Figure 1:
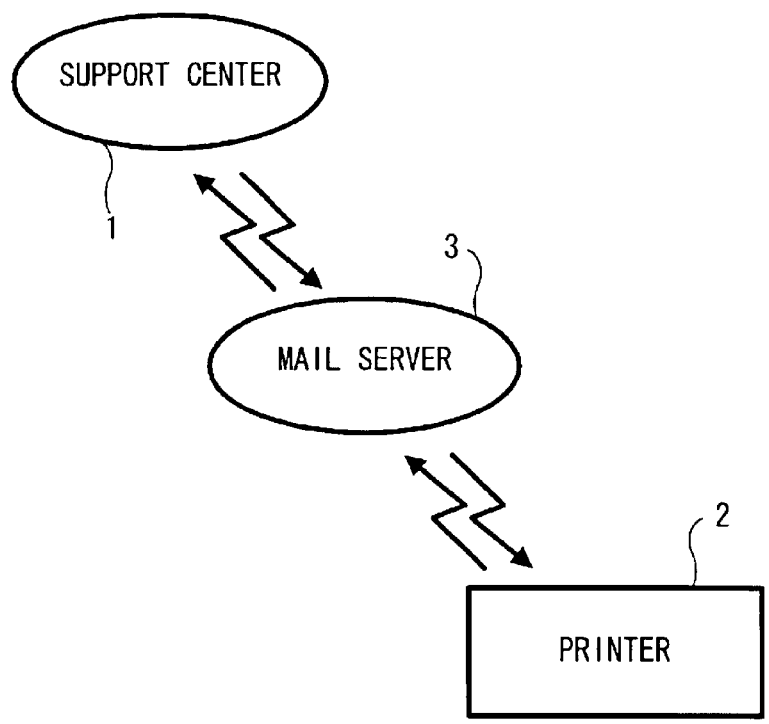
FIG. 1 is a block diagram showing a general structure of a service support system for an image forming apparatus according to an embodiment of the invention.

As shown in FIG. 1, the invention is applied to a service support system for a printer 2 wherein a support center 1 and the printer 2 are accessible to a mail server 3 through a network.

Figure 2:
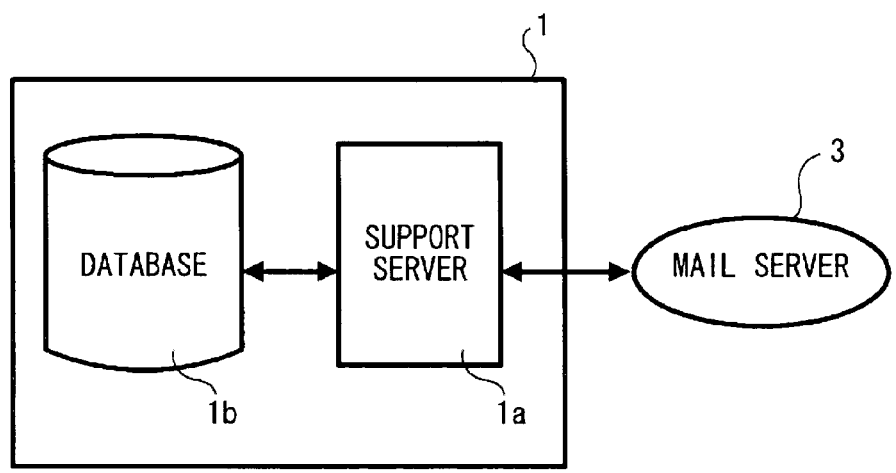
FIG. 2 is a block diagram showing a general structure of a support center of the system in FIG. 1.

As shown in FIG. 2, the support center 1 is provided with a support server 1a and a database 1b. The support server 1a is accessible to the mail server 3 through a network, such as the Internet, to read mail arrived in the mail server 3 periodically or when the mail server 3 provides notification of incoming mail. Information about the printer 2 (hereinafter referred to as printer information) is contained in a message or an attachment to the message of the mail.

The database 1b stores information about specific maintenance and cleaning processes. The support server 1a uses the printer information read from the mail server 3 as a keyword, to read information about a specific maintenance or cleaning process from the database 1b. Alternatively, the support server 1a comprehensively diagnoses the current condition of the printer 2 based on the printer information, and uses the result of the diagnosis as a keyword, to read information about a specific maintenance or cleaning process from the database 1b. Then, the support server 1a records the information in mail as a mail message or an attachment to the message and sends the mail to the mail server 3.

Figure 3:
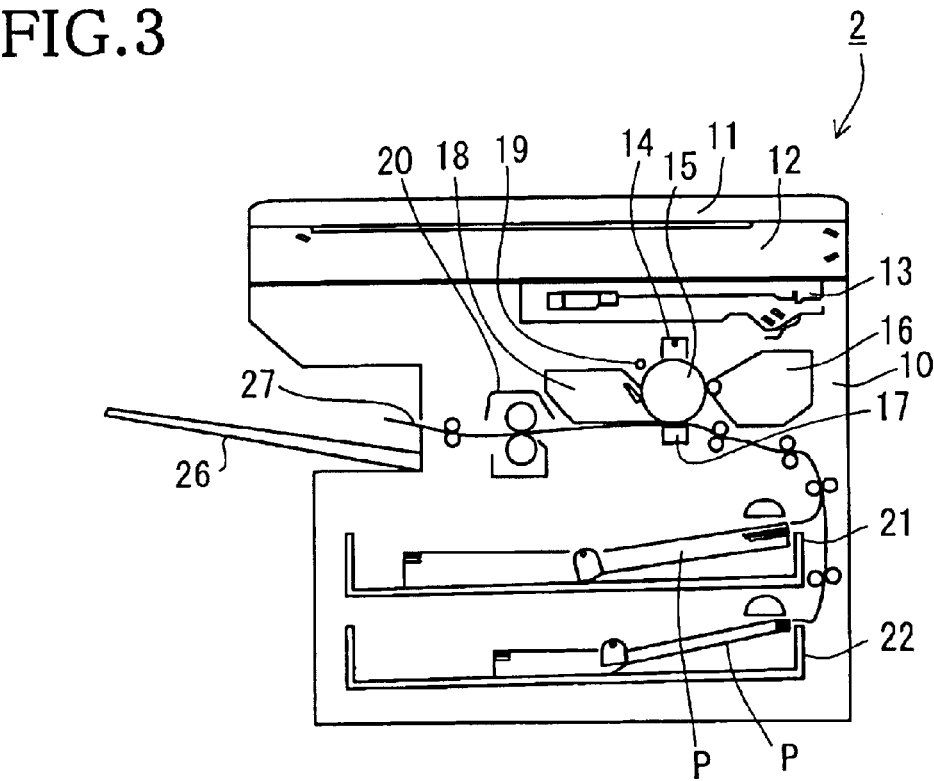
FIG. 3 is a sectional view showing a general structure of a printer as an example of the image forming apparatus of the system in FIG. 1.

A structure of the printer 2 will be described. As shown in FIG. 3, the printer 2 is of an electrophotographic type, and includes a casing 10, a document reader 12 with an openable document cover 11, a laser emitter 13, a charging device 14, a drum photosensitive member 15, a developing device 16 with toner, a transferring device 17, a cleaning device 18, a discharging device 19, a fixing device 20 made up of a pair of fixing rollers, paper cassettes 21, 22 and a discharge paper tray 26 for receiving a discharging sheet 27.

In the printer 2, the surface of the photosensitive member 15 is uniformly charged with negative corona discharge by the charger 14, and irradiated with a laser beam emitted from a laser diode of the laser emitter 13, and an electrostatic latent image is formed on the surface of the photosensitive member 15. The electrostatic latent image formed on the surface of the photosensitive member 15 is visualized as toner image by toner carried on the developing device 16. The toner image is transferred onto a sheet P, fed from the paper cassette 21, 22 in accordance with a copy operation by the transferring device 17.

The sheet P is conveyed to the fixing device 20, and heated and pressed in the fixing device 20. This causes the toner image to be fixed on the sheet P, and the sheet P where the toner image is fixed is ejected onto the discharge tray 26. Toner remaining on the photosensitive member 15 from which the toner image is transferred to the sheet P is removed by the cleaning device 18 and electrical charge remaining on the photosensitive member 15 is removed by the discharging device 19. With this cycle, a copy process is repeated.

Figure 4:
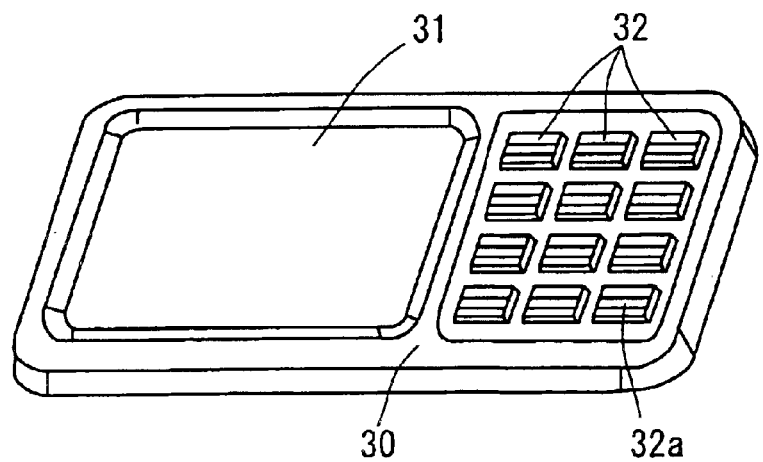
FIG. 4 is a perspective view of an operation panel of the printer in FIG. 3.

An operation panel 30 is provided on an upper part of the printer 2. The operation panel 30 includes a display part 31, which is an LCD panel, and an operation part 32 as shown in FIG. 4. The LCD panel of the display part 31 can display text of several lines or a simplified image. The operation part 32 includes a maintenance button 32a. When the user presses the maintenance button 32a, a process for sending the printer information to the mail server 3 is started.

Figure 5:
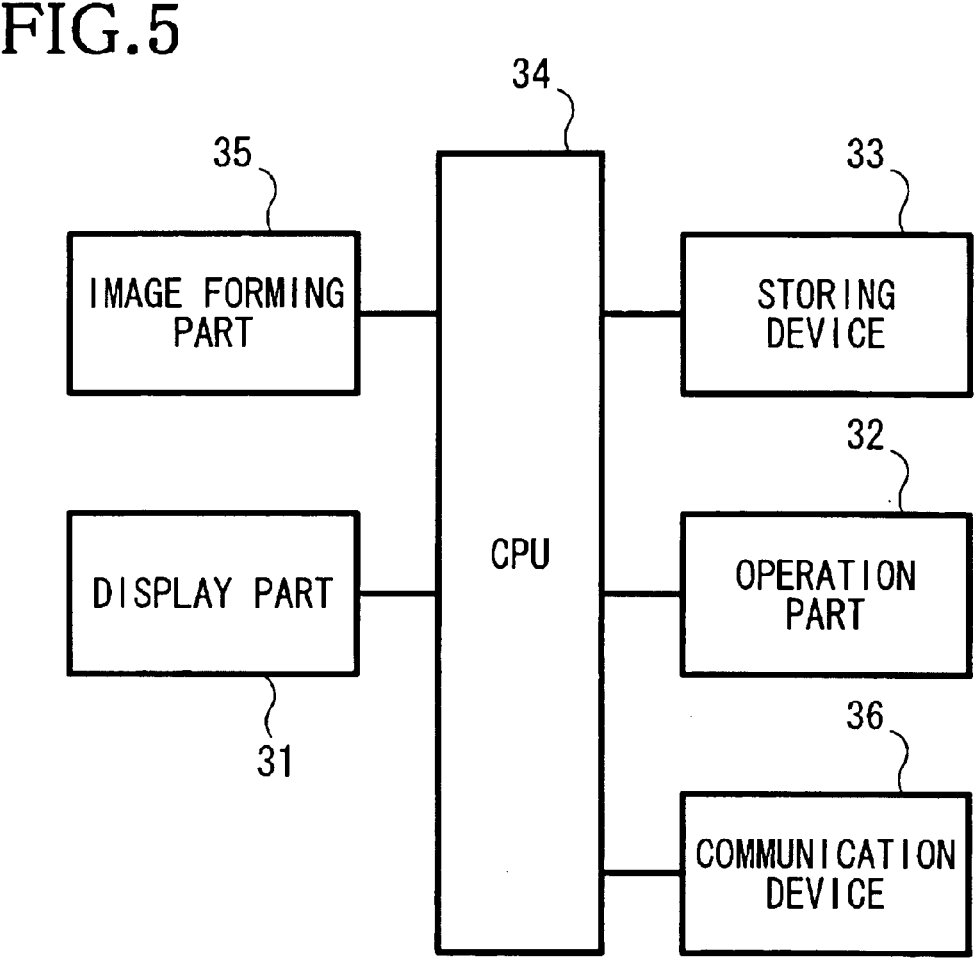
FIG. 5 is a block diagram showing a structure of a control part of the printer in FIG. 3.

FIG. 5 shows a block diagram of a control part in the printer 2. As shown in FIG. 5, the control part includes a CPU 34 and a storing device 33. The CPU 34 controls an image forming part 35 including the laser emitter 13 and the photosensitive member 15, the display part 31 and the operation part 32 of the operation panel 30. Further, the CPU 34 controls a communication device 36 so as to communicate externally through the network like the Internet.

Figure 6:
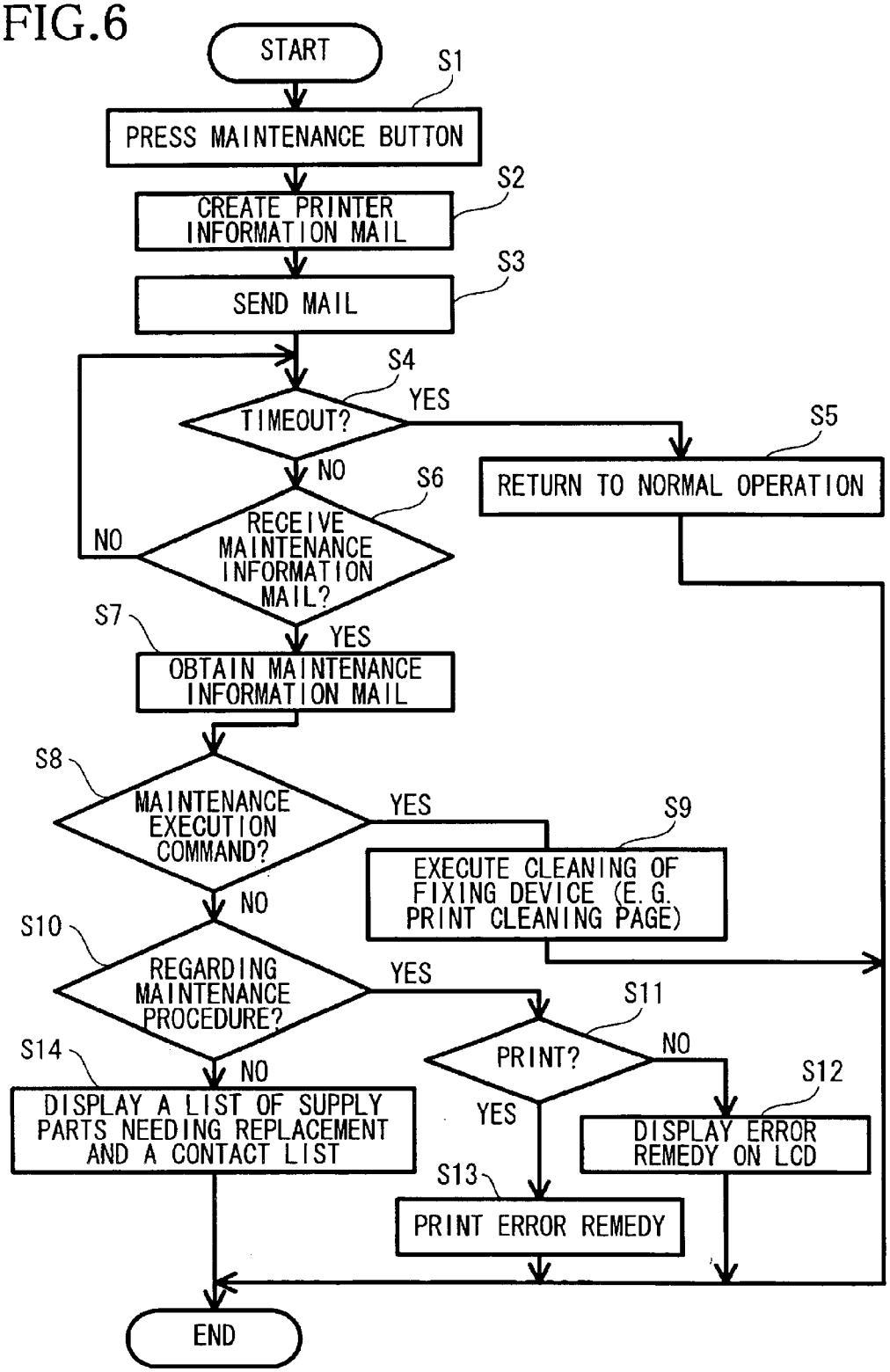
FIG. 6 is a flowchart of a maintenance process for the printer in FIG. 3.

A process to be performed in the support system having the printer 2 and the support center 1 will be described with reference to FIG. 6.

When the CPU 34 detects that the user has pressed the maintenance button 32a (S1), it creates printer information mail (S2). Specifically, it creates an email message or an attachment to the email message containing the information about the printer 2, for example, a model name and serial number, which are previously stored in the storing device 33, a remaining lifetime of each supply part, which is measured by the CPU34 and stored in the storing device 33 at any time, the number of times of replacement of each supply part, the number of printed sheets, a mean coverage showing print ratio per page, the number of paper jams, the number of printed sheets counted by paper size, the current status of the printer 2, the number of errors, and error descriptions. The printer information does not need to include all items listed above. The printer information may include any of them.

After creating the printer information mail, the CPU 34 controls the communication device 36 to send the printer information mail to the mail server 3 (S3).

After sending the printer information mail, the CPU 34 goes into a standby status and waits to receive maintenance information mail as a reply from the support server. In the standby status for waiting to receive the maintenance information mail, the CPU 34 detects an event of a timeout (S4). When the maintenance information mail does not arrive at the mail server 3, even after a fixed time elapses for some reason such as network clogging, the CPU 34 determines that a timeout has occurred (S4: Yes), and returns to a normal operation (S5). Thereafter, the CPU 34 may determine whether the maintenance information mail arrives at the mail server 3 after the fixed time.

On the other hand, if a timeout has not occurred (S4: No), the CPU 34 determines whether the maintenance information mail arrives at the mail server 3 (S6) by accessing the mail server 3 at periodical intervals or checking whether arrival of incoming mail from the mail server 3 is present.

When the maintenance information mail arrives at the mail server 3 (S6: Yes), the CPU 34 obtains the maintenance information mail from the mail server 3 (S7).

The maintenance information mail is created by the support server 1a of the support center 1. The support server 1a extracts maintenance information from the database 1b using the printer information contained in the printer information mail as a keyword, and records the extracted maintenance information in mail as an email message or an attachment to the email message.

Specifically, the maintenance information the support server 1a extracts refers to, for example, print data of cleaning pages, a list of supply parts and consumable items needing replacement soon, a contact list for supply parts and consumable items to be purchased, error remedy procedures, and cleaning operation descriptions at each device of the printer 2 (e.g. the fixing device). The maintenance information is provided with print data for printing with the printer 2, display data for displaying on the display part 31 of the printer 2, and execution commands and programs for operating each device of the printer 2.

Further, in the embodiment, plural types of print data for cleaning pages are prepared. For example, when the fixing rollers of the fixing device 20 are cleaned, a sheet where a cleaning page is printed is passed between the rollers. While the sheet is passed between the rollers, the toner adhered on the rollers are transferred onto the sheet and eliminated from the rollers. At this time, the toner adhered on the fixing rollers is removed by absorption at an image pattern of the cleaning page printed on the sheet. Therefore, practicable cleaning characteristics vary with image patterns designed on the cleaning pages. Conversely, cleaning that best fits the current condition of the printer 2 can be carried out by selecting a cleaning page having an image pattern of which a cleaning characteristic matches the degree and type of contamination of the fixing rollers.

The cleaning pages are provided with various patterns: a sloped line and wavy line having a specified width, stripes of the sloped lines or wavy lines spaced with specified intervals, a group of x letters made up of the sloped lines and the wavy lines disposed so as to cross each other, a grid of a combination of the sloped lines and the wavy lines disposed so as to cross each other, a wholly solid fill, images formed on both edges in a print area or only in a specified area where conveying rollers and pressing rollers contact. Each pattern is stored in association with a contamination type and degree (cleaning characteristic) with which cleaning can be done. The support server 1a comprehensively diagnoses the type and degree of contamination on the fixing device 20 based on the received printer information, and reads a cleaning page having an appropriate pattern from the database 1b using the diagnosis result as a keyword.

The maintenance information stored in the database 1b includes various kinds of information regarding maintenance procedures, such as a remedy for a current error, and information regarding supply parts and consumable items including replacement time and purchase contact for a supply part or consumable item, for example, toner cartridge. Any user can perform maintenance of the printer 2 without fail by operating the printer 2 and replacing a supply part or consumable item with a new one in accordance with the maintenance procedures and the supply part and consumable item information.

Information about each of the maintenance procedures is stored, in association with the print data for printing out on the printer 2, and the display data for displaying on the display part 31 of the printer 2 in the database 1b. The user can thus obtain the information about a necessary maintenance procedure without fail either by a paper copy or the display part 31 if a paper jam occurs or toner has run out at the printer 2 side or the LCD panel is out of order. The support server 1a is designed such that it uses the received printer information as a keyword, reads information about a maintenance procedure currently needed from the database 1b, and captures both print data and display data for the maintenance procedure in the maintenance information mail.

In an alternative, the support server 1a may diagnose whether the printer 2 can produce a paper copy of the maintenance procedure or display the maintenance procedure on the LCD panel based on the received printer information, and select either the print data or the display data, of which is considered available to provide the procedure as a result of the diagnosis, and capture the selected data in the maintenance information mail. This enables the volume of the maintenance information mail to be decreased. Therefore, when mail is sent and received on a dialup line, communications costs for the mail exchange can be lowered.

Besides, the print data and the display data employed in one maintenance procedure may visually have a similar output image. Generally, however, the display part 31 of the printer 2 is inferior to a paper copy obtained by printing in terms of display ability (display size) and reproductivity (resolution). For this reason, the display data is basically made up of text minimally listed, and the print data is made up of combination of an image of each part of the printer 2 and a corresponding description to describe a maintenance procedure of each part of the printer 2. With the above data structure, as long as printing is available on the printer 2, maintenance procedures are preferably given with the print data for printing, so that the user can understand the procedures easily. Therefore, in this alternative, when both printing and displaying are available, the print data may be selected in preference to the display data.

When the maintenance information mail in which the CPU 34 has obtained includes a command or program to execute maintenance (S8: Yes), specifically, a command or program to execute print data of a cleaning page and a cleaning execution command regarding the fixing rollers, the CPU 34 prints a cleaning page based on the print data and shifts the printer 2 into the cleaning execution mode based on the cleaning execution command. In the cleaning execution mode, the rotational speed of the fixing rollers is set to slow and the temperature of the fixing device 20 is set to high as compared with the normal printing mode. In this mode, a sheet where the cleaning page has been printed is conveyed between the fixing rollers of the fixing device 20 to eliminate the residual toner from the rollers (S9).

On the other hand, when the maintenance information mail does not include a command or program to execute maintenance (S8: No) and is about a maintenance procedure (S10: Yes), the CPU 34 decides whether to print the maintenance procedure (S11). Specifically, the CPU 34 determines whether an error that disables printing occurs in the printer 2. As a result, when the CPU 34 determines the error has occurred (S11: No), a remedy for the error is displayed on the display part 31 (S12). Therefore, the user can perform appropriate maintenance at the sight of the information on the display part 31. On the other hand, when the CPU 34 decides to print the maintenance information (S11: Yes), the remedy for the error is printed (S13). Consequently, the user can perform appropriate maintenance at the sight of the printed information.

When the maintenance information mail indicates a list of supply parts needing replacement soon and a contact list for supply parts to be purchased (S10: No), the CPU 34 displays them on the display part 31 (S14). Therefore, the user can obtain an appropriate time for part replacement and a contact from which a replaced item should be purchased.

According to the above embodiment, with one push of the maintenance button 32a, the user can take an appropriate action by obtaining the latest and most suitable maintenance information and error remedy information, or appropriate maintenance can be automatically performed in the printer 2 in some cases.

In the above embodiment, the information about a maintenance procedure is provided with both the print data and the display data from the support center 1, and is either printed or displayed on the display part 31. However, at the creation of the printer information mail, determination may be done at the printer 2 side as to whether printing is available. In this case, information in which data, either the print data or the display data, is acceptable at the printer side may be contained in the printer information mail. Upon the receipt of the information, the support center 1 may capture only one of the data in the maintenance information mail.

In the above embodiment, the printer 2 accesses the mail server 3 via email, however, the invention is not limited to such a structure. For example, access can be made through a personal computer to the support server 1a of the support center 1. Communication protocol is not limited, but is typically done through TCP/IP (Transmission Control Protocol/Internet Protocol). In this case, a page for service support that the support center 1 offers is displayed on a browser installed in the personal computer, and an IP (Internet Protocol) address for the printer 2 is entered on the page. This allows the support server 1a to access the printer 2 based on the entered IP address and directly obtain the printer information. (In short, the printer 2 transmits the printer information to the support server 1a on demand.) Then, the support server 1a, which has obtained the printer information, transmits maintenance information suitable for the printer information to the printer 2. At this time, the maintenance information may be transmitted indirectly to the printer 2 through a personal computer or directly to the printer 2. When the maintenance information is transmitted to the printer 2 through a personal computer, the following can be considered: a page regarding the maintenance information is displayed on the personal computer monitor, a button on the page is pressed so that the maintenance information in HTML (Hyper Text Markup Language) format is sent from the support server 1a to the personal computer, and the maintenance information is sent to the printer 2.

In the above embodiment, an electrophotographic printer is used as an example of an image forming apparatus, however, the invention is not limited to this example. It can be applied to various printers such as an inkjet printer and a thermal printer. Additionally, the invention can be applied to not only printers but also facsimile machines, copiers, and complex machines.

Further, in the above embodiment, the printer information is transmitted when the maintenance button 32a is pressed. However, the invention is not limited to this example. The printer information may be automatically transmitted when a specified period of time elapses or a printing operation is performed a set number of times. Additionally, the printer information may be transmitted when a specified error such as a paper jam is detected.

In addition, the invention is not limited to the system where the printer 2 and the support server 1a directly communicate with each other. In the system, the printer information from the printer 2 may be transmitted to the support server 1a via a personal computer, and the maintenance information from the support server 1a may arrive at the printer 2 via a personal computer. In short, any communication path is possible as long as the printer information from the printer 2 can be transmitted to the support server 1a and the maintenance information from the support server 1a can arrive at the printer 2. However, when communication between the printer 2 and the support server 1a is performed via a personal computer, a burden on processing of the computer is increased, a time lag between transmission of the printer information and arrival of the maintenance information becomes significant. Therefore, it can be said that the structure where the printer 2 and the support server 1a directly communicate with each other is preferable.

It should be understood that the invention is not limited in its application to the details of structure and arrangement of parts illustrated in the accompanying drawings. The invention is capable of other embodiments and of being practiced or performed in various ways without departing from the technical idea thereof, based on existing and well-known techniques among those skilled in the art.

What is claimed is:

1. A service support system for an image forming apparatus comprising the image forming apparatus and a service support center, which communicate with each other with messages on a network,
    the image forming apparatus comprising:
        a printing device that outputs an image on a printing medium;
        an extracting device that extracts information regarding the image forming apparatus required for a service support;
        a sending device that sends the information extracted by the extracting device to the service support center as a main body of a message or an attachment to the message;
        a receiving device that receives a reply message from the service support center in response to the message sent by the sending device; and
        a control device that activates the image forming apparatus based on the reply message;
    the service support center comprising:
        a database that previously stores a plurality of maintenance processes required for the image forming apparatus;
        a receiving device that receives the message sent from the image forming apparatus;
        a searching device that searches maintenance information corresponding to the information contained in the received message from the database; and
        a sending device that sends the searched maintenance information to the image forming apparatus as a main body of the reply message or an attachment to the reply message, wherein the database of the service support center previously stores a plurality of image data for cleaning pages associated with cleaning processes required for the image forming apparatus, the service support center searches the image data for a cleaning page matching the information sent from the image forming apparatus from the database and sends the image data for the cleaning page to the image forming apparatus as the main body of the reply message or the attachment to the reply message, and the image forming apparatus receives the reply message and activates the printing device based on the image data contained in the reply message to output the cleaning page.

2. The service support system according to claim 1, wherein the messages are electronic mail, and the sending devices and the receiving devices of the image forming apparatus and the service support center constitute electronic mail exchanging devices that mutually sends and receives electronic mail between the image forming apparatus and the service support center.

3. The service support system according to claim 1, wherein the information of the image forming apparatus includes at least one of a model number, a serial number, a remaining lifetime of a supply part, a type of a supply part, a total number of printed printing media, a mean coverage per page, a number of times of jamming of the printing media, a number of the printing media according to size, an operating status of the image forming apparatus, a number of errors, and a description of an error.

4. The service support system according to claim 1, wherein the image forming apparatus further comprises an operation part for requesting the service support from the service support center, and the image forming apparatus activates the extracting device and the sending device in an event of an operation of the operation part.

5. The service support system according to claim 1, wherein the maintenance information contained in the received reply message includes a program practicable on the image forming apparatus, and the control device of the image forming apparatus performs a maintenance process in accordance with the program.

6. The service support system according to claim 1, wherein the information of the image forming apparatus refers to information about conditions and quality of an image forming operation of the image forming apparatus, and the searching device of the service support center estimates a type and degree of contamination present in the image forming apparatus based on the received information about the conditions and the quality and searches image data of the cleaning page corresponding to the type and degree of the contamination from the cleaning pages each having a different image pattern.

7. The service support system according to claim 6, wherein the printing device of the image forming apparatus has a fixing roller structure having a pair of rollers that fix an image onto a printing medium carrying the image while the printing medium is conveyed between the rollers, and the searching device of the service support center estimates a type and degree of contamination of the fixing roller structure based on the received information about the conditions and the quality, and searches a cleaning page corresponding to the type and degree of the contamination.

8. The service support system according to claim 1, wherein
the database of the service support center previously stores a plurality of display data and print data regarding maintenance procedures required for the image forming apparatus,
the searching device of the service support center searches a maintenance procedure corresponding to the information contained in the received message from the database,
the service support center further comprises a determining device that determines which of display data and print data regarding the searched maintenance procedure is provided based on the information,
the sending device of the service support center sends one of the display data and the print data regarding the searched maintenance procedure to the image forming apparatus based on a result of determination by the determining device as the main body of the reply message or the attachment to the reply message,
the image forming apparatus further comprises a displaying device that displays various kinds of information,
the control device receives the reply message and selectively activates the printing device or the displaying device based on the reply message.

9. The service support system according to claim 8, wherein the determining device of the service support center identifies whether the printing device of the image forming apparatus is currently usable based on the inside information, the determining device determines to provide print data if the recording device is usable, and determines to provide display data if the recording device is not usable.

10. The service support system according to claim 1, wherein
the database of the service support center previously stores a plurality of display data and print data regarding maintenance procedures required for the image forming apparatus,
the searching device of the service support center searches a maintenance procedure corresponding to the information sent from the image forming apparatus from the database,
the sending device of the service support center sends display data and print data regarding the searched maintenance procedure to the image forming apparatus as the main body of the reply message or the attachment to the reply message,
the image forming apparatus further comprises a displaying device that displays various kinds of information and a determining device that determines whether the printing device is currently usable based on the information,
the control device receives the reply message and selectively activates the printing device to print the print data or the displaying device to display the display data based on a result of determination by the determination device.

11. An image forming apparatus that exchanges messages with a service support center via a network and receives a service support information via a message, the image forming apparatus comprising:
an printing device that outputs an image to a printing medium;
a displaying device that displays various information;
a extracting device that extracts information regarding the image forming apparatus required for a service support;
a determining device that determines which of display data or print data of service support information to receive from the service support center based on the information;
a sending device that sends the information extracted by the extracting device and a result of a determination by the determining device to the service support center as the main body of the message or an attachment to the message;
a receiving device that receives a reply message from the service support center in response to the message sent by the sending device; and
a control device that selectively activates the printing device or the displaying device based on the reply message, wherein a database of the service support center previously stores a plurality of image data for cleaning pages associated with cleaning processes required for the image forming apparatus, the service support center searches the image data for a cleaning page matching the information sent from the image forming apparatus from the database and sends the image data for the cleaning page to the image forming apparatus as the main body of the reply message or the attachment to the reply message, and the image forming apparatus receives the reply message and activates the printing device based on the image data contained in the reply message to output the cleaning page.

12. The image forming apparatus according to claim 11, wherein the messages are electronic mail, the sending device and the receiving device constitute an electronic mail exchanging device that sends and receives electronic mail between the image forming apparatus and the service support center.

13. The image forming apparatus according to claim 11, wherein the information of the image forming apparatus includes at least any of a model number, a serial number, a remaining lifetime of a supply part, a type of a supply part, a total number of printed printing media, a mean coverage per page, a number of times of jamming of the printing media, a number of the printing media according to size, an operating status of the image forming apparatus, a number of errors, and a description of an error.

14. The image forming apparatus according to claim 11, wherein the image forming apparatus further comprises an operation part for requesting a service support from the service support center, and activates the extracting device and the sending device in an event of operation of the operation part.

15. A method of providing service support with a service support center and an image forming apparatus, comprising:

extracting information regarding the image forming apparatus required for a service support;

sending the information extracted to the service support center as a main body of a message or an attachment to the message;

searching a database of the service support center, that previously stores a plurality of maintenance processes required for the image forming apparatus, for maintenance information corresponding to the information contained in the message;

sending the searched maintenance information to the image forming apparatus as a main body of a reply message or an attachment to the reply message; and activating the image forming apparatus based on the reply message, wherein the database of the service support center previously stores a plurality of image data for cleaning pages associated with cleaning processes required for the image forming apparatus, the service support center searches the image data for a cleaning page matching the information sent from the image forming apparatus from the database and sends the image data for the cleaning page to the image forming apparatus as the main body of the reply message or the attachment to the reply message, and the image forming apparatus receives the reply message and activates the printing device based on the image data contained in the reply message to output the cleaning page.

16. The method of claim 15, wherein the database is searched for the image data for one of a plurality of cleaning pages, associated with cleaning processes required for the image forming apparatus which has been previously stored in the database, corresponding to the information contained in the message or the attachment to the message.

* * * * *